United States Patent
Masaki

(10) Patent No.: US 7,623,678 B2
(45) Date of Patent: Nov. 24, 2009

(54) IMAGE PICK-UP APPARATUS HAVING A FUNCTION OF AUTOMATICALLY PICKING-UP AN OBJECT IMAGE AND AUTOMATIC IMAGE PICK-UP METHOD

(75) Inventor: Yasuo Masaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 691 days.

(21) Appl. No.: 11/329,740

(22) Filed: Jan. 11, 2006

(65) Prior Publication Data

US 2006/0197845 A1    Sep. 7, 2006

(30) Foreign Application Priority Data

Feb. 24, 2005    (JP) .............................. 2005-048681

(51) Int. Cl.
*G06K 9/00* (2006.01)
*G03B 13/18* (2006.01)

(52) U.S. Cl. .................... 382/103; 382/118; 396/96

(58) Field of Classification Search .............. 382/100, 382/103, 107, 115, 118, 123, 168, 175, 181, 382/190, 194, 199, 203, 209, 219, 232, 255, 382/274, 276, 286–291, 312, 321; 396/95, 396/133, 96; 345/660; 250/201.8; 348/348

See application file for complete search history.

(56) References Cited

U.S. PATENT DOCUMENTS

| 5,079,582 | A | * | 1/1992 | Hamada et al. ............. 396/133 |
| 5,525,792 | A | * | 6/1996 | Kusaka .................... 250/201.8 |
| 5,650,607 | A | * | 7/1997 | Kusaka .................... 250/201.8 |
| 5,930,532 | A | * | 7/1999 | Matsumoto ................ 396/95 |
| 7,298,412 | B2 | * | 11/2007 | Sannoh et al. ............. 348/348 |
| 7,443,404 | B2 | * | 10/2008 | Kawamoto et al. .......... 345/660 |

FOREIGN PATENT DOCUMENTS

| JP | 08-279954 | * | 10/1996 |
| JP | 2003-092701 | | 3/2003 |

(Continued)

OTHER PUBLICATIONS

Patent Abstracts of Japan, Application No. 2003-092701 dated Mar. 28, 2003 (1 page).

(Continued)

*Primary Examiner*—Seyed Azarian
(74) *Attorney, Agent, or Firm*—Osha • Liang LLP

(57) ABSTRACT

A movement area detecting unit detects, in an image frame divided into a plurality of blocks, a block having a movement as a movement area, based on simple image data. A face detecting unit detects a human face based on the simple image data. When a human face is detected by the face detecting unit in the movement area detected by the movement area detecting unit and the movement in the movement area including the human face stops, an image pick-up operation is performed. Therefore, when an image is to be picked up in a self-timer image pick-up mode for automatically picking-up an image of an operator himself/herself as an object, the image pick-up operation takes place at the optimal timing when the operator as the object reaches and stands still at the desired position for the photograph.

1 Claim, 3 Drawing Sheets

FOREIGN PATENT DOCUMENTS

JP          2003-107335     *   4/2003

OTHER PUBLICATIONS

Patent Abstracts of Japan, Application No. 08-279954 dated Oct. 22, 1996 (1 page).

Japanese Office Action for Japanese Application No. 2005-048681, mailed on Nov. 27, 2007 (3 pages).

Patent Abstracts of Japan for Japanese Publication No. 2003-107335, Publication date Apr. 9, 2003 (1 page).

* cited by examiner

IMAGE PICK-UP APPARATUS HAVING A FUNCTION OF AUTOMATICALLY PICKING-UP AN OBJECT IMAGE AND AUTOMATIC IMAGE PICK-UP METHOD

BACKGROUND OF THE INVENTION

1. Field of the Invention

The present invention relates to an image pick-up apparatus and to an automatic image pick-up method and, more specifically, it relates to an image pick-up apparatus having a function of automatically picking-up an image of an object and to an automatic image pick-up method.

2. Description of the Background Art

When a photograph of an operator of a digital camera himself/herself as an object is to be taken in an automatic image pick-up mode with a self-timer, an image pick-up operation takes place automatically after a prescribed time period from pressing of a shutter button. Specifically, the automatic image pick-up operation takes place a prescribed time period after pressing the shutter button, no matter whether the operator has reached a desired position or whether the operator is standing still at the position for photographing or not. Consequently, timely image pick-up is not always possible, and desired images are not always obtained.

In view of the foregoing, a method has been used in which a digital camera is remote-controlled to enable timely image pick-up. In that case, however, a remote controller, a light receiving unit for the remote controller and associated circuitry must be provided, so that the apparatus comes to have a complicated structure. Therefore, it is desirable to realize an image pick-up apparatus having a simple structure and capable of performing an image pick-up operation at a good timing.

Japanese Patent Laying-Open No. 2003-092701 discloses an imaging apparatus in which a release button is pressed automatically by recognizing and discriminating a face image so as not to lose a good timing for image pick-up, to prevent pick-up of a blurred image and to store sharp images only. According to the disclosure, a face feature storage section for storing feature data of a plurality of faces and a recognition/discrimination section for recognizing a face on the basis of image data of an object and the data stored in the face feature storage to discriminate each part of the face are provided.

Japanese Patent Laying-Open No. 8-279954 discloses an image pickup device that enables accurate set up of focus and exposure in a simple manner to obtain desired images without fail. According to the disclosure, in a self-timer image pickup mode, movement of an object is detected based on a motion vector or on a change in luminance, and the focus and exposure are set after it is determined that the movement has stopped.

In the technique of Japanese Patent Laying-Open No. 2003-092701, means for detecting movement of an object is not provided, and therefore, image pick-up operation might possibly be performed even when the object is not still. In the technique disclosed in Japanese Patent Laying-Open No. 8-279954, means for detecting the face of an object is not provided, and therefore, image pick-up operation might possibly be performed even when an object other than the intended human object stops its motion. Therefore in the conventional image pick-up apparatuses, it has been impossible to perform the image pick-up operation at a right timing when an object person is to be photographed automatically.

SUMMARY OF THE INVENTION

Therefore, a main object of the present invention is to provide an image pick-up apparatus capable of performing an image pick-up operation at an optimal timing when an object person is to be photographed automatically, and to provide a method of automatic image pick-up.

The present invention provides an image pick-up apparatus having a self-timer image pick-up mode for automatically picking-up an image of an operator himself/herself as an object, including: an image obtaining unit obtaining image data by photoelectrically converting an optical image of the object obtained through a lens; a movement area detecting unit operating in response to activation of the self-timer image pick-up mode for detecting, in an image frame divided into a plurality of blocks, a block having a movement as a movement area, based on the image data; a face detecting unit operating in response to activation of the self-timer image pick-up mode for detecting a human face based on the image data; and a control unit for performing, when a human face is detected by the face detecting unit in the movement area detected by the movement area detecting unit, an image pick-up operation automatically focusing on the human face detected by the face detecting unit, when movement in the movement area including the human face stops.

According to another aspect, the present invention provides an image pick-up apparatus having a function of automatically picking-up an image of an object, including: an image obtaining unit obtaining image data by photoelectrically converting an optical image of the object obtained through a lens; a movement area detecting unit for detecting, in an image frame divided into a plurality of blocks, a block having a movement as a movement area, based on the image data; a face detecting unit for detecting a human face based on the image data; and a control unit for performing, when a human face is detected by the face detecting unit in the movement area detected by the movement area detecting unit, an image pick-up operation automatically focusing on the human face detected by the face detecting unit, when movement in the movement area including the human face stops.

Preferably, the image pick-up apparatus has a self-timer image pick-up mode, in which an image of the operator himself/herself as an object is automatically picked-up. The movement area detecting unit and the face detecting unit operate in response to activation of the self-timer image pick-up mode. The control unit forces an image pick-up operation after a prescribed time period from activation of the self-timer image pick-up mode.

Preferably, the apparatus further includes a light emitting device that emits light in response to activation of the self-timer image pick-up mode and stops light emission in response to the end of image pick-up operation.

Preferably, the control unit performs the image pick-up operation automatically focusing on the face of a person detected by the face detecting unit.

The present invention also provides an automatic image pick-up method, for automatically picking-up an image of an object, including: an image obtaining step of obtaining image data by photoelectrically converting an optical image of the object obtained through a lens; a movement area detecting/face detecting step of detecting, in an image frame divided into a plurality of blocks, a block having a movement as a movement area, and detecting a human face, based on the image data; and an image pick-up step of performing, when a human face is detected in the movement area detected in the movement area detecting/face detecting step, an image pick-up operation when movement in the movement area including the human face stops.

The present invention provides an image pick-up apparatus having a self-timer image pick-up mode for automatically picking-up an image of an operator himself/herself as an object, including: an image obtaining unit obtaining image data by photoelectrically converting an optical image of the object obtained through a lens; a movement area detecting unit operating in response to activation of the self-timer image pick-up mode for detecting, in an image frame divided into a plurality of blocks, a block having a movement as a movement area, based on the image data; a face detecting unit operating in response to activation of the self-timer image pick-up mode for detecting a human face based on the image data; and a control unit for performing, when a human face is detected by the face detecting unit in the movement area detected by the movement area detecting unit, an image pick-up operation automatically focusing on the human face detected by the face detecting unit, when movement in the movement area including the human face stops. As the movement area detecting unit and the face detecting unit are provided, when an image of the operator himself/herself as an object is to be picked-up in the self-timer image pick-up mode, the image pick-up operation is done when the object person reaches a position desired for the photograph and stands still at the position. Consequently, when an image of an object person is to be picked-up automatically, the image pick-up operation can be performed at an optimal timing. Further, as the apparatus is adapted to focus on the face of the person detected by the face detecting unit, the object person can be accurately focused.

According to another aspect, the present invention provides an image pick-up apparatus having a function of automatically picking-up an image of an object, including: an image obtaining unit obtaining image data by photoelectrically converting an optical image of the object obtained through a lens; a movement area detecting unit for detecting, in an image frame divided into a plurality of blocks, a block having a movement as a movement area, based on the image data; a face detecting unit for detecting a human face based on the image data; and a control unit for performing, when a human face is detected by the face detecting unit in the movement area detected by the movement area detecting unit, an image pick-up operation automatically focusing on the human face detected by the face detecting unit, when movement in the movement area including the human face stops. As the movement area detecting unit and the face detecting unit are provided, the image pick-up operation is done when the object person reaches a position desired for the photograph and stands still at the position. Consequently, when an image of an object person is to be picked-up automatically, the image pick-up operation can be performed at an optimal timing.

The present invention also provides an automatic image pick-up method, for automatically picking-up an image of an object, including: an image obtaining step of obtaining image data by photoelectrically converting an optical image of the object obtained through a lens, a movement area detecting/face detecting step of detecting, in an image frame divided into a plurality of blocks, a block having a movement as a movement area, and detecting a human face, based on the image data; and an image pick-up step of performing, when a human face is detected in the movement area detected in the movement area detecting/face detecting step, an image pick-up operation when movement in the movement area including the human face stops. Therefore, the image pick-up operation is done when the object person reaches a position desired for the photograph and stands still at the position. Consequently, when an image of an object person is to be picked-up automatically, the image pick-up operation can be performed at an optimal timing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
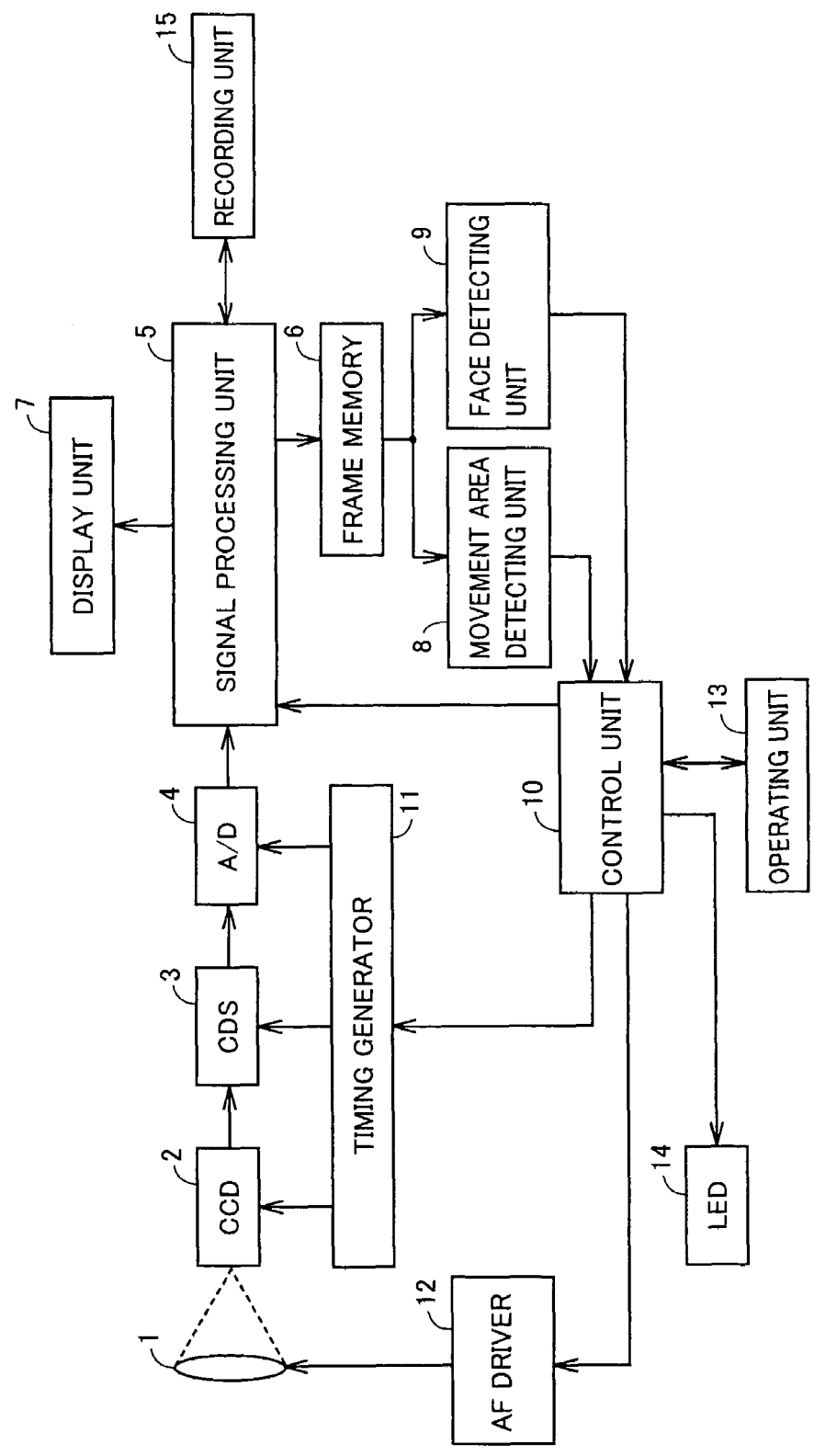
FIG. 1 is a block diagram showing a schematic configuration of the image pick-up apparatus in accordance with an embodiment of the present invention.

FIG. 1 is a block diagram showing a schematic configuration of the image pick-up apparatus in accordance with an embodiment of the present invention. Referring to FIG. 1, the image pick-up apparatus includes a lens 1, a CCD 2, a CDS (Correlated Double Sampling) circuit 3, an A/D (analog/digital) conversion circuit 4, a signal processing unit 5, a frame memory 6, a display unit 7, a movement area detecting unit 8, a face detecting unit 9, a control unit 10, a timing generator 11, an AF driver 12, an operating unit 13, an LED (light emitting diode) 14, and a recording unit 15.

Lens 1 collects an optical image of the object. CCD 2 performs photoelectric conversion on the optical image of the object collected by lens 1. CDS circuit 3 performs correlated double sampling on the output signal of CCD 2, to reduce noise. A/D conversion circuit 4 performs analog/digital conversion on the output signal of CDS circuit 3.

Signal processing unit 5 performs image processing such as luminance/color separation on the output signal of A/D conversion circuit 4, obtains image data and temporarily stores the data in frame memory 6. Further, signal processing unit 5 performs image conversion for compressing the image data stored in frame memory 6 to JPEG format or the like. Frame memory 6 is formed, for example, of an SDRAM memory that temporarily stores image data frame by frame. It is noted, however, that dependent on the processing ability of signal processing unit 5, the image data may be directly subjected to the compression process without using frame memory 6. Display unit 7 is, for example, a liquid crystal display (LCD), on which the image data processed by signal processing unit 5 is displayed.

Movement area detecting unit 8 detects, in an image frame divided into a plurality of blocks, a block that includes a movement, based on the image data from frame memory 6. Face detecting unit 9 detects a human face based on the image data from frame memory 6.

Control unit 10 controls the overall operation of image pick-up apparatus, based on a control program. Control unit 10 performs the image pick-up operation when movement in the movement area including a human face stops, based on the result of detection by movement area detecting unit 8 and face detecting unit 9.

Timing generator 11 generates various timing signals such as a reading pulse, a vertical transfer pulse, and a horizontal transfer pulse, and applies these to CCD 2, CDS circuit 3 and A/D conversion circuit 4. AF driver 12 drives and controls lens 1 to realize automatic focusing on the object.

Operating unit 13 includes a shutter button instructing an image pick-up operation, and a button for setting the self-timer image pick-up mode. LED 14 emits light when the shutter button of operating unit 13 is pressed, and stops light emission when the image pick-up operation ends. Recording unit 15 is a memory card such as a smart media or a compact flash (registered trademark), which stores the image data compressed by signal processing unit 5.

By connecting a USB cable to an external terminal, not shown, the image data stored in recording unit 15 may be transferred to a personal computer.

Figure 2:
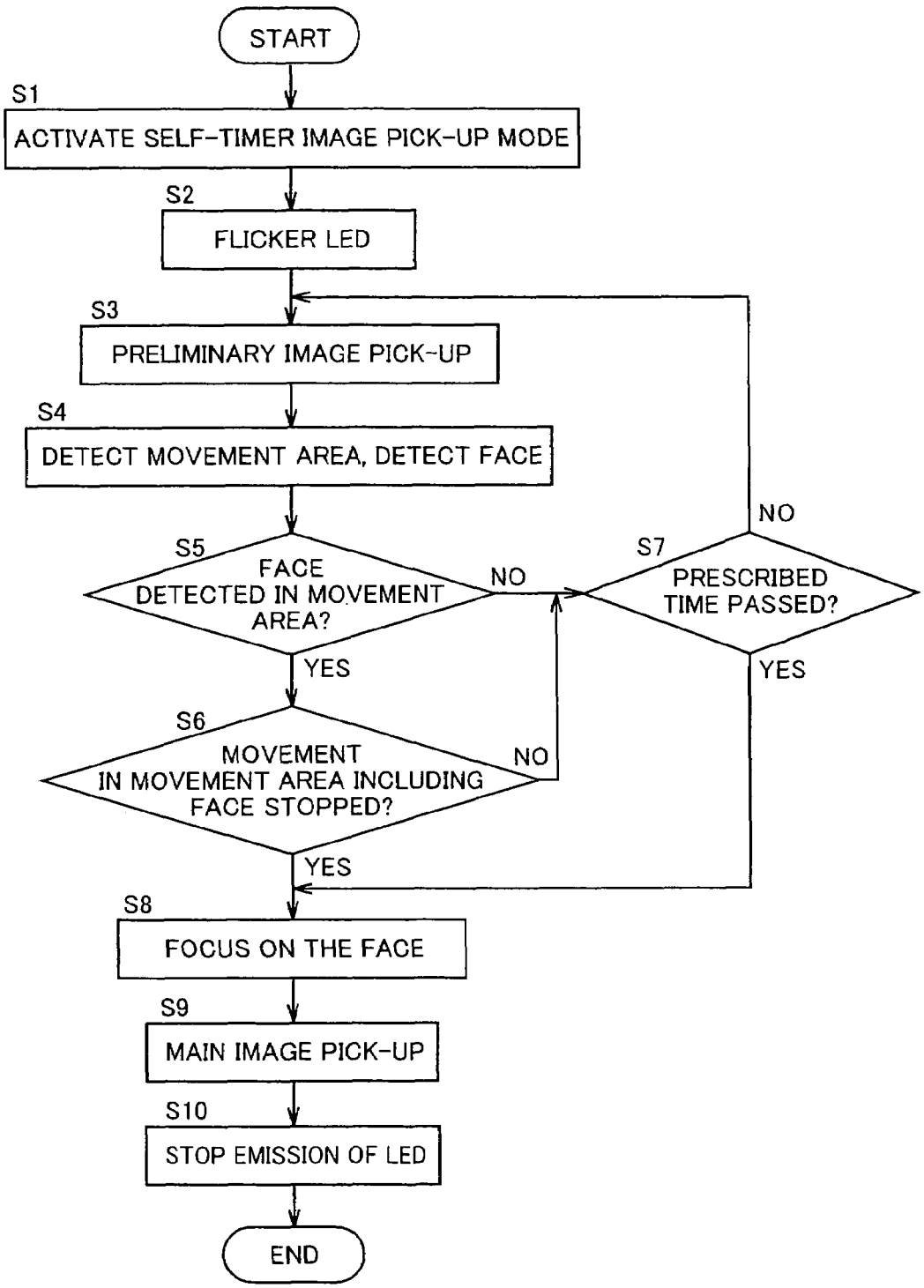
FIG. 2 is a flow chart representing an operation of the image pick-up apparatus shown in FIG. 1.

FIG. 2 is a flow chart representing the operation of the image pick-up apparatus shown in FIG. 1. First, an operator sets the self-timer image pick-up mode, using operating unit 13.

In step S1, the operator confirms picture composition using an optical finder, not shown, and presses the shutter button of operating unit 13, whereby the self-timer image pick-up mode is activated. In response, in step S2, control unit 10 flickers LED 14, informing the operator that the self-timer image pick-up mode is activated. The operator moves to a desired position for the photograph.

In step S3, a preliminary image pick-up operation is performed, in which CCD 2 takes in an optical image of the object and acquires simple image data of low resolution. Signal processing unit 5 temporarily stores at least one frame of simple image data in frame memory 6.

Thereafter, in step S4, movement area detecting unit 8 detects, based on the simple image data from frame memory 6, a block having a movement from an image frame divided into a plurality of blocks, as a movement area. Further, face detecting unit 9 detects a human face based on the simple image data from frame memory 6.

Figure 3:
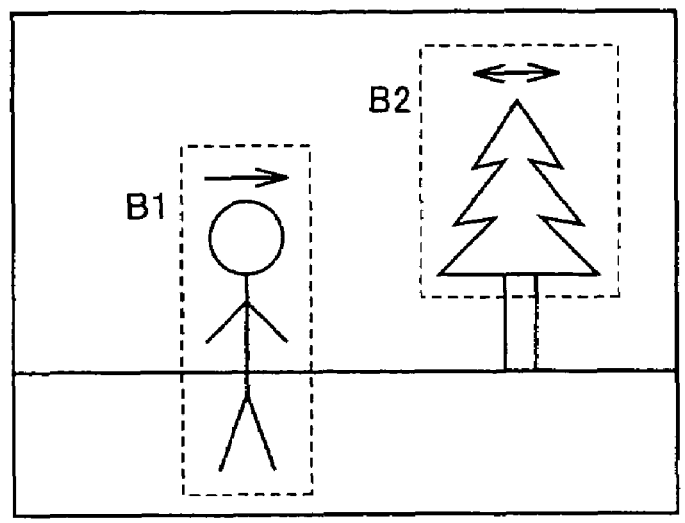
FIG. 3 is an illustration of a movement area detecting operation.

FIG. 3 is an illustration representing the movement area detecting operation by movement area detecting unit 8. The movement area detecting operation is performed by utilizing, for example, motion vector detection method in which a motion vector V is detected, a frame difference method in which correlation between frames is found, or a background difference method in which an area having movement is identified on an almost motionless background.

When the motion vector detection method is used, for example, movement area detecting unit 8 reads a plurality of continuous frames of simple image data from frame memory 6, and, by way of example, based on a change in luminance level, detects the motion vector V. Specifically, a block in which the absolute value of motion vector V is not smaller than a threshold value in the image frame is detected as the movement area.

A block B1 including the person as the object is detected as a movement area from when the person enters the image frame until he/she reaches the desired position. When the person reaches the desired position for image pick-up and stands still, motion vector V converges. A block B2 including a tree on the background is detected as a movement area as long as the tree is blown in the wind.

Figure 4:
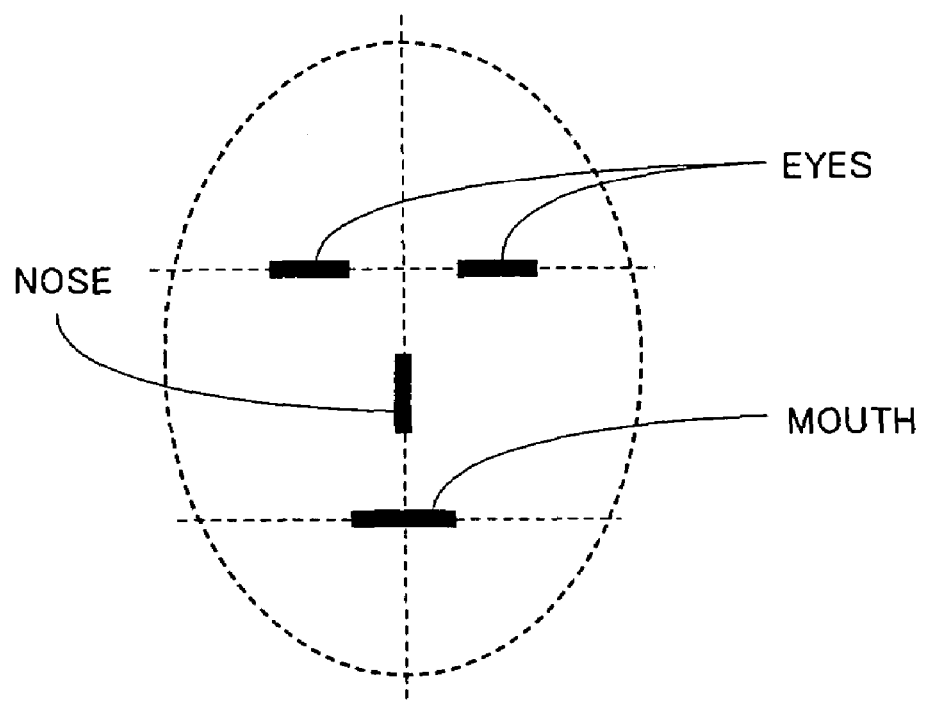
FIG. 4 is an illustration of a face detecting operation.

FIG. 4 is an illustration related to the face detecting operation by face detecting unit 9. The face detecting operation is done based on various algorithms. What is necessary is simply to detect whether the object is a person or not, and it is unnecessary to recognize the identity of the person.

Face detecting unit 9 reads the simple image data from frame memory 6, and based on the shades of the image, detects feature portions of a face, including eyes, nose and mouth. For instance, using a horizontal filter, two eyes positioned along the horizontal direction and a mouth arranged below the eyes are detected, and by using a vertical filter, a nose positioned along the vertical direction between the two eyes and the mouth is detected. The detected pattern of eyes, nose and mouth is compared with a preset face pattern, and a human face is detected. The face detecting operation is performed using, for example, a neural network.

Here, a human face may be detected with skin color information added for making the decision. Further, the feature portions of one's face such as eyes, nose and mouth may be detected using infrared ray. The method of face detection is not limited to those described above, and any other method that can identify that an object is a human may be used.

Returning to FIG. 2, in step S5, control unit 10 determines whether or not a human face is detected by face detecting unit 9 in movement area detected by movement area detecting unit 8. When a human face is detected in the movement area (YES), the flow proceeds to step S6, and when the object person reaches and stops at the desired position for photography, that is, when the movement in the movement area including the human face stops (YES), the flow proceeds to step S8.

When the human face is not detected in the movement area in step S5 (NO), or when the movement in the movement area including the human face is not stopped in step S6, the flow proceeds to step S7. In step S7, whether a prescribed time has passed from the activation of self-timer image pick-up mode or not is determined. If the prescribed time has not passed, the flow returns to step S3, and if passed, the flow proceeds to step S8.

In step S8, control unit 10 drives and controls AF driver 12 such that the apparatus focuses on the human face portion detected by face detecting unit 9. Consequently, the human object is accurately focused. In step S9, an optical image of the object is taken by CCD 2, and a main image pick-up operation is performed, in which a plurality of frames of image data with high resolution are taken. Signal processing unit 5 temporarily stores the obtained plurality of frames of image data in frame memory 6. Then, the plurality of pieces of image data stored in frame memory are read, compressed and stored in recording unit 15, and the main image pick-up operation ends. When the operator himself/herself is the object of image pick-up in the self-timer mode, it is impossible for the operator to confirm the object image, and therefore, continuous image pick-up as described above is performed.

In step S10, in response to the end of main image pick-up operation, control unit 10 stops emission of light from LED 14, to inform the operator that the image pick-up operation ends.

As described above, as the movement area detecting unit 8 and the face detecting unit 9 are provided, when an image of the operator himself/herself as an object is to be picked-up in the self-timer image pick-up mode, the image pick-up operation is done when the object person reaches a position desired for the photograph and stands still at the position. Consequently, when an image of an object person is to be picked-up automatically, the image pick-up operation can be performed at an optimal timing. Further, as the apparatus is adapted to focus on the face of the person detected by the face detecting unit 9, the object person can be accurately focused.

Application of the present invention is not limited to a digital camera having the self-timer image pick-up mode, and the present invention may be applied to any image pick-up apparatus that is capable of picking-up an image of an object automatically, such as a monitor camera having an automatic image pick-up mode in which the image pick-up operation is performed automatically when a movement in a movement area including a face is stopped.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image pick-up apparatus having a function of automatically picking-up an image of an object, comprising:

an image obtaining unit obtaining image data by photoelectrically converting an optical image of the object obtained through a lens;

a movement area detecting unit for detecting, in an image frame divided into a plurality of blocks, a block having a movement as a movement area, based on said image data; a face detecting unit for detecting a human face based on said image data; and a control unit for performing, when a human face is detected by said face detecting unit in the movement area detected by said movement area detecting unit, an image pick-up operation automatically focusing on the human face detected by said face detecting unit, when movement in the movement area including the human face stops, wherein the image pick-up apparatus has a self-timer image pick-up mode for automatically picking up an image of an operator himself/herself as an object, said movement area detecting unit and said face detecting unit operate in response to activation of said self-timer image pick-up mode, and said control unit forces said image pick-up operation when a prescribed time period passes from the activation of said self-timer image pick-up mode.

* * * * *